US012136846B2

United States Patent
Prasad et al.

(10) Patent No.: US 12,136,846 B2
(45) Date of Patent: Nov. 5, 2024

(54) VEHICLE INTEGRATED DC-DC ENERGY TRANSFER

(71) Applicant: GM Global Technology Operations LLC, Detroit, MI (US)

(72) Inventors: Rashmi Prasad, Troy, MI (US); Chandra S. Namuduri, Troy, MI (US); Avoki M. Omekanda, Rochester, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 241 days.

(21) Appl. No.: 17/743,737

(22) Filed: May 13, 2022

(65) Prior Publication Data
US 2023/0369879 A1   Nov. 16, 2023

(51) Int. Cl.
*H02J 7/34* (2006.01)
*H02M 3/335* (2006.01)
*B60L 50/60* (2019.01)

(52) U.S. Cl.
CPC .............. *H02J 7/342* (2020.01); *H02M 3/335* (2013.01); *B60L 50/60* (2019.02); *B60L 2210/12* (2013.01)

(58) Field of Classification Search
CPC ...... H02J 7/342; H02M 3/335; H02M 1/0095; H02M 1/32; H02M 3/1586; H02M 1/0064; H02M 3/1584; H02M 7/5387; B60L 50/60; B60L 2210/12; B60L 53/57; B60L 2220/54; B60L 53/11; B60L 55/00; B60L 53/14; B60L 53/24; Y02T 10/70; Y02T 10/7072; Y02T 90/12; Y02T 90/14; Y02T 90/16; Y02T 90/167; Y02T 10/72; Y02T 10/40; Y02T 10/62; Y02T 90/10
USPC ....... 307/9.1, 10.1, 10.7; 320/108, 109, 104, 320/128, 162, 136, 145, 119, 105
See application file for complete search history.

(56) References Cited

U.S. PATENT DOCUMENTS

| | | | |
|---|---|---|---|
| 11,383,607 B1* | 7/2022 | Prasad | B60L 53/24 |
| 2015/0231978 A1* | 8/2015 | Danner | B60L 53/24 |
| | | | 307/10.1 |
| 2019/0047433 A1* | 2/2019 | Rozman | B60W 20/00 |

* cited by examiner

*Primary Examiner* — Elim Ortiz
(74) *Attorney, Agent, or Firm* — CANTOR COLBURN LLP

(57) ABSTRACT

Electrical energy is transferred between an on-vehicle DC power source and an off-vehicle DC power source by controlling conduction of the phase legs of a power inverter to operatively configure the power inverter and the stator phase windings of a traction motor as a switched-mode power converter including the at least one phase winding and at least one switch of one of the phase legs.

20 Claims, 4 Drawing Sheets

VEHICLE INTEGRATED DC-DC ENERGY TRANSFER

INTRODUCTION

The subject disclosure relates to electric vehicle (EV) power transfer. More particularly, the subject disclosure relates to electric power transfer between an on-vehicle power source and an off-vehicle power source for an EV.

EVs may include battery electric vehicles (BEV) or hybrid electric vehicles (HEV), each of which may include an electric traction motor providing or contributing propulsion torque to the powertrain and powered by a rechargeable energy storage system (RESS) through a traction power inverter module (TPIM).

SUMMARY

In one exemplary embodiment, a method for electrical energy transfer between an on-vehicle DC power source and an off-vehicle DC power source, the on-vehicle DC power source and the off-vehicle DC power source having respective nominal voltages, wherein the nominal voltage of the on-vehicle DC power source is greater than the nominal voltage of the off-vehicle DC power source, includes establishing a rotor position of a traction motor at a predetermined electrical angle, coupling the on-vehicle DC power source between positive and negative DC rails of a power inverter having a plurality of phase legs coupled to a corresponding plurality of stator phase windings of the on-vehicle traction motor, coupling the off-vehicle DC power source to at least one phase winding of the plurality of stator phase windings through a charge port connection, the coupling including validating the charge port connection and closing high current disconnect switches in the off-vehicle DC power source, and controlling conduction of the plurality of phase legs of the power inverter to operatively configure the power inverter and the plurality of stator phase windings as a switched-mode power converter including the at least one phase winding and at least one switch of one of the plurality of phase legs.

In addition to one or more of the features described herein, controlling conduction of the plurality of phase legs of the power inverter includes initially controlling conduction with an increasing duty cycle pulse width modulation up to a predetermined maximum duty cycle.

In addition to one or more of the features described herein, each phase leg of the power inverter may include respective upper and lower solid-state switches, wherein controlling conduction of the plurality of phase legs of the power inverter may include controlling conduction of the respective upper solid-state switch of at least one phase leg to operatively configure the power inverter and the plurality of stator phase windings as a switched-mode power converter operating in a buck mode wherein energy is transferred from the on-vehicle DC power source to the off-vehicle DC power source.

In addition to one or more of the features described herein, each phase leg of the power inverter may include respective upper and lower solid-state switches, wherein controlling conduction of the plurality of phase legs of the power inverter may include controlling interleaved conduction of the respective upper solid-state switches of at least two phase legs to operatively configure the power inverter and the plurality of stator phase windings as a switched-mode power converter operating in a buck mode wherein energy is transferred from the on-vehicle DC power source to the off-vehicle DC power source.

In addition to one or more of the features described herein, each phase leg of the power inverter may include respective upper and lower solid-state switches, wherein controlling conduction of the plurality of phase legs of the power inverter may include controlling synchronous conduction of the respective upper solid-state switches of at least two phase legs to operatively configure the power inverter and the plurality of stator phase windings as a switched-mode power converter operating in a buck mode wherein energy is transferred from the on-vehicle DC power source to the off-vehicle DC power source.

In addition to one or more of the features described herein, each phase leg of the power inverter may include respective upper and lower solid-state switches, wherein controlling conduction of the plurality of phase legs of the power inverter may include controlling conduction of the respective lower solid-state switch of at least one phase leg to operatively configure the power inverter and the plurality of stator phase windings as a switched-mode power converter operating in a boost mode wherein energy is transferred from the off-vehicle DC power source to the on-vehicle DC power source.

In addition to one or more of the features described herein, each phase leg of the power inverter may include respective upper and lower solid-state switches, wherein controlling conduction of the plurality of phase legs of the power inverter may include controlling interleaved conduction of the respective lower solid-state switches of at least two phase legs to operatively configure the power inverter and the plurality of stator phase windings as a switched-mode power converter operating in a boost mode wherein energy is transferred from the off-vehicle DC power source to the on-vehicle DC power source.

In addition to one or more of the features described herein, each phase leg of the power inverter may include respective upper and lower solid-state switches, wherein controlling conduction of the plurality of phase legs of the power inverter may include controlling synchronous conduction of the respective lower solid-state switches of at least two phase legs to operatively configure the power inverter and the plurality of stator phase windings as a switched-mode power converter operating in a boost mode wherein energy is transferred from the off-vehicle DC power source to the on-vehicle DC power source.

In addition to one or more of the features described herein, the predetermined electrical angle may be determined based on a selectable degree of configuration of the plurality of stator phase windings.

In another exemplary embodiment, an apparatus for electrical energy transfer between an on-vehicle DC power source and an off-vehicle DC power source may include the on-vehicle DC power source and the off-vehicle DC power source having respective nominal voltages, wherein the nominal voltage of the on-vehicle DC power source is greater than the nominal voltage of the off-vehicle DC power source, a traction motor including a poly-phase stator winding having a plurality of stator phase windings commonly coupled at a neutral terminal and having respective phase terminals, a power inverter having a plurality of phase legs coupled between positive and negative DC rails, the positive and negative DC rails coupled across the on-vehicle DC power source, and each phase leg including respective upper and lower solid-state switches with a respective phase pole therebetween coupled to a respective one of the stator phase windings at its corresponding phase terminal, at least one switch between the off-vehicle DC power source and the poly-phase stator winding, and a controller establishing a rotor position of the traction motor at a predetermined electrical angle, coupling the off-vehicle DC power source to at least one phase winding of the plurality of stator phase windings through a charge port connection, the coupling including validating the charge port connection, closing high current disconnect switches in the off-vehicle DC power source, and operating the at least one switch closed, and controlling conduction of the phase legs of the power inverter to operatively configure the power inverter and the stator phase windings as a switched-mode power converter including at least one of the stator phase windings and one of the upper and lower solid-state switches of at least one of the phase legs.

In addition to one or more of the features described herein, the at least one switch between the off-vehicle DC power source and the poly-phase stator winding may include a switch between the off-vehicle DC power source and the respective phase terminal of one of the stator phase windings.

In addition to one or more of the features described herein, the at least one switch between the off-vehicle DC power source and the poly-phase stator winding may include a plurality of switches, each one of the plurality of switches between the off-vehicle DC power source and the corresponding respective phase terminal of a respective one of the stator phase windings.

In addition to one or more of the features described herein, the at least one switch between the off-vehicle DC power source and the poly-phase stator winding may include a switch between the off-vehicle DC power source and the neutral terminal of the plurality of stator phase windings.

In addition to one or more of the features described herein, the predetermined electrical angle may be determined based on a selectable degree of configuration of the plurality of stator phase windings.

In addition to one or more of the features described herein, controlling conduction of the phase legs of the power inverter may include controlling conduction of the respective upper solid-state switch of at least one phase leg to operatively configure the power inverter and the stator phase windings as a switched-mode power converter operating in a buck mode wherein energy is transferred from the on-vehicle DC power source to the off-vehicle DC power source.

In addition to one or more of the features described herein, each phase leg of the power inverter may include respective upper and lower solid-state switches, wherein controlling conduction of the phase legs of the power inverter may include controlling interleaved conduction of the respective upper solid-state switches of at least two phase legs to operatively configure the power inverter and the stator phase windings as a switched-mode power converter operating in a buck mode wherein energy is transferred from the on-vehicle DC power source to the off-vehicle DC power source.

In addition to one or more of the features described herein, wherein each phase leg of the power inverter may include respective upper and lower solid-state switches, wherein controlling conduction of the phase legs of the power inverter may include controlling synchronous conduction of the respective upper solid-state switches of at least two phase legs to operatively configure the power inverter and the stator phase windings as a switched-mode power converter operating in a buck mode wherein energy is transferred from the on-vehicle DC power source to the off-vehicle DC power source.

In addition to one or more of the features described herein, each phase leg of the power inverter may include respective upper and lower solid-state switches, wherein controlling conduction of the phase legs of the power inverter includes controlling conduction of the respective lower solid-state switch of at least one phase leg to operatively configure the power inverter and the stator phase windings as a switched-mode power converter operating in a boost mode wherein energy is transferred from the off-vehicle DC power source to the on-vehicle DC power source.

In addition to one or more of the features described herein, each phase leg of the power inverter may include respective upper and lower solid-state switches, wherein controlling conduction of the phase legs of the power inverter may include controlling interleaved conduction of the respective lower solid-state switches of at least two phase legs to operatively configure the power inverter and the stator phase windings as a switched-mode power converter operating in a boost mode wherein energy is transferred from the off-vehicle DC power source to the on-vehicle DC power source.

In addition to one or more of the features described herein, each phase leg of the power inverter may include respective upper and lower solid-state switches, wherein controlling conduction of the phase legs of the power inverter may include controlling synchronous conduction of the respective lower solid-state switches of at least two phase legs to operatively configure the power inverter and the stator phase windings as a switched-mode power converter operating in a boost mode wherein energy is transferred from the off-vehicle DC power source to the on-vehicle DC power source.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
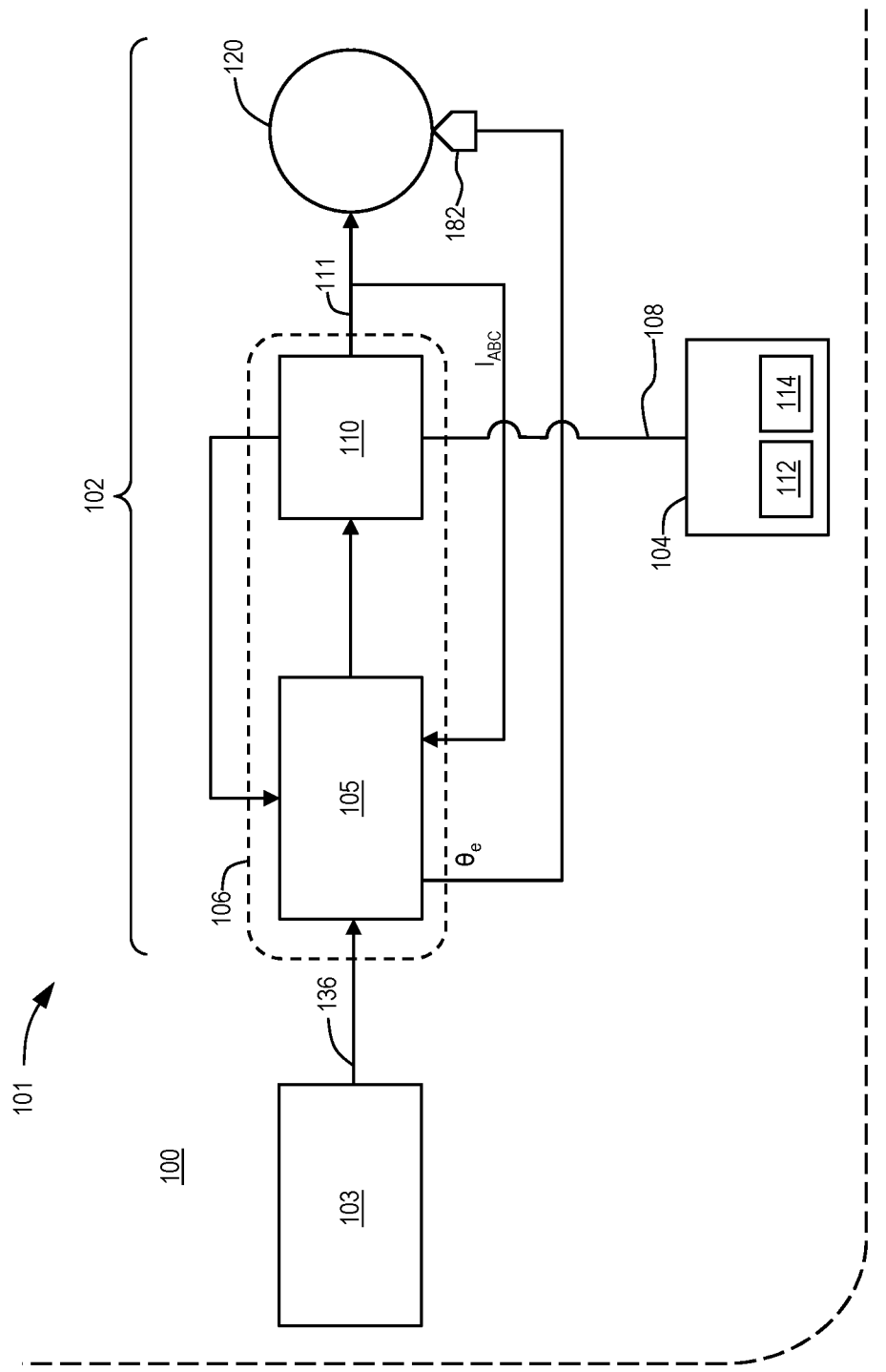
FIG. 1 illustrates an electric propulsion system on a host vehicle, in accordance with one or more embodiments.

The following description is merely exemplary in nature and is not intended to limit the present disclosure, its application or uses. Throughout the drawings, corresponding reference numerals indicate like or corresponding parts and features.

Figure 2:
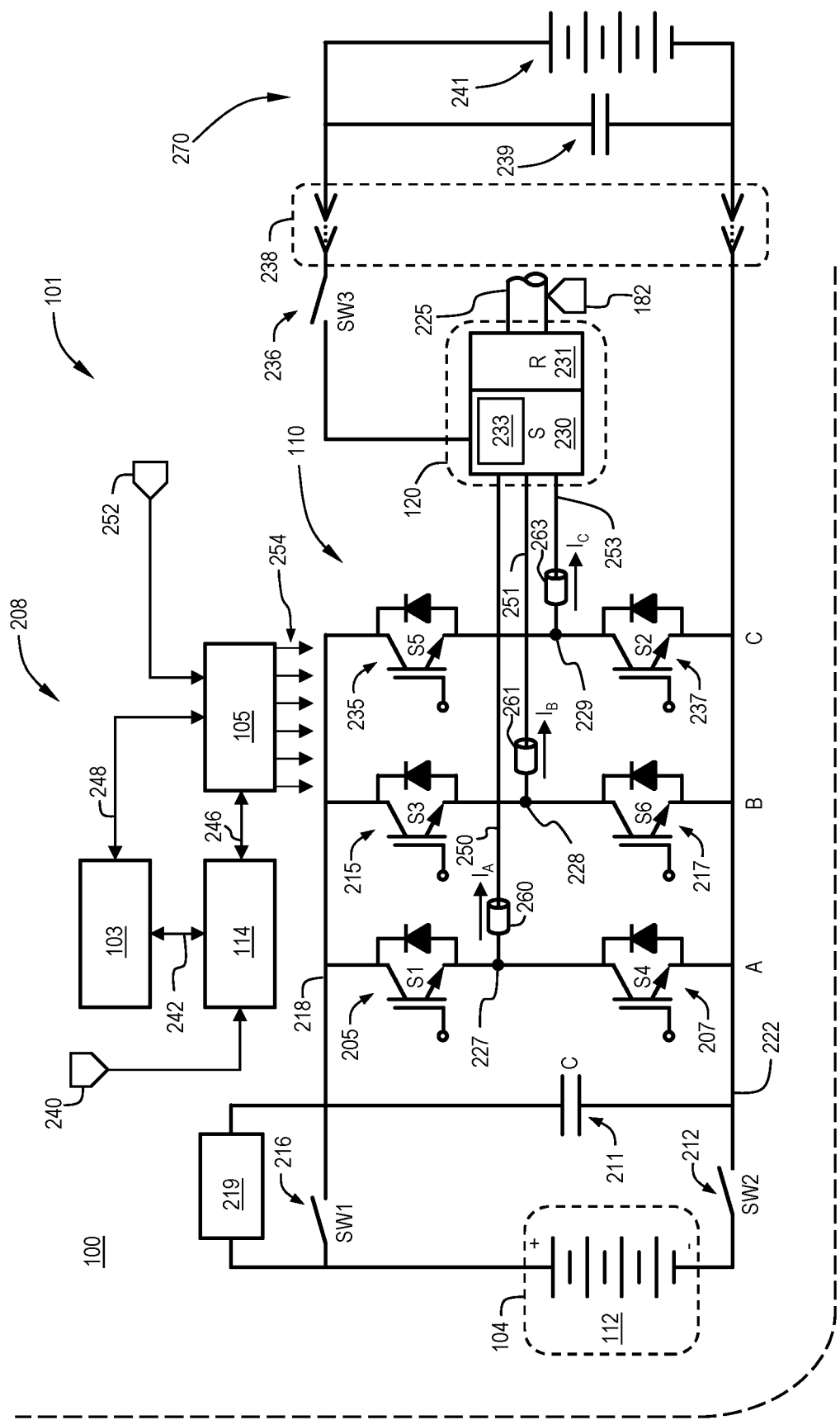
FIG. 2 illustrates an electric propulsion system on a host vehicle and an off-vehicle power source configured for electric power transfer between an on-vehicle power source and the off-vehicle power source, in accordance with one or more embodiments.

FIG. 1 schematically illustrates an embodiment of an electric propulsion system 101 on a host vehicle 100. Vehicle and vehicular are understood to refer to any means of transportation including non-limiting examples of motorcycles, cars, trucks, buses, excavation, earth moving, construction and farming equipment, railed vehicles like trains and trams, and watercraft like ships and boats. The electric propulsion system 101 may include various control components, electrical and electro-mechanical systems including, for example, a rechargeable energy storage system (RESS) 104 and an electric drive unit (EDU) 102. The electric propulsion system 101 may be employed on a powertrain system to generate propulsion torque as a replacement for, or in conjunction with, an internal combustion engine in various electric vehicle (EV) applications and hybrid electric vehicle (HEV) applications, respectively. The EDU 102 may be of varying complexity, componentry and integration. An exemplary highly integrated EDU 102 may include, for example, an alternating current (AC) motor (motor) 120 and a traction power inverter module (TPIM) 106 including a motor controller 105 and a power inverter 110. The motor 120 may include a motor output shaft 225 (FIG. 2). The motor output shaft may transfer torque between the motor 120 and other driveline components (not illustrated), for example a final drive which may include reduction and differential gear sets and one or more axle outputs. The final drive may simply include reduction gearing and a prop shaft output coupling to a differential gear set. One or more axles may couple to the final drive or differential gear sets if separate therefrom. Axle(s) may couple to a vehicle wheel(s) for transferring tractive force between a wheel and pavement. One having ordinary skill in the art will recognize alternative arrangements for driveline components. Propulsion torque requests or commands (Tcmd) 136 may be provided by a vehicle controller 103 to the motor controller 105.

The RESS 104 may, in one embodiment, include an electro-chemical battery pack 112, for example a high capacity, high voltage (HV) rechargeable lithium ion battery pack for providing power to the vehicle via a HV direct current (DC) bus 108. The RESS 104 may also include a battery manager 114. High capacity battery packs may include a plurality of battery pack modules (modules) allowing for flexibility in configurations and adaptation to application requirements. In vehicular uses, the battery pack 112 may be modular, for example consisting of multiple modules that may be variously and selectively configured in accordance with propulsion architecture and charging functions. Selective reconfiguration of the modules in the battery pack 112 may be by way of controllable switches for opening and closing various electrical paths effective to provide various parallel and series configurations of modules. For example, the battery pack 112 may include a pair of modules having a nominal voltage of 400 volts being configured in parallel in 400 volt propulsion architectures during propulsion and in series at a nominal voltage of 800 volts during direct current fast charging (DCFC). Alternatively, the battery pack 112 may be configured at a nominal voltage of 800 volts in 800 volt propulsion architectures during both propulsion and DCFC. The battery pack 112 may also be selectively coupled to the HV DC bus and to charge ports by way of controllable switches. Some or all such controllable switches may be integrated into one or more controllable battery disconnect units (BDU) (not illustrated) or distributed variously within components or subsystems such as the RESS 104.

The motor 120 may be a poly-phase AC motor receiving poly-phase AC power over a poly-phase motor control power bus (AC bus) 111 which is coupled to the power inverter 110. In one embodiment, the motor 120 is a three-phase motor and the power inverter 110 is a three-phase inverter. The power inverter 110 may include a plurality of solid-state switches such as IGBTs and power MOSFETs. The power inverter 110 receives DC power over the HV DC bus 108 from the RESS 104, for example at 800 volts. The motor controller 105 is coupled to the power inverter 110 for control thereof. The power inverter 110 electrically connects to stator phase windings of a poly-phase stator winding of the motor 120 via the AC bus 111, with electric current monitored on two or three of the phase leads thereof. The power inverter 110 is configured with suitable control circuits including paired power transistors (e.g., IGBTs for transforming high-voltage DC electric power to high-voltage AC electric power and transforming high-voltage AC electric power to high-voltage DC electric power). The power inverter 110 may employ pulse width modulation (PWM) control to convert stored DC electric power originating in the battery pack 112 of the RESS 104 to AC electric power to drive the motor 120 to generate torque. Similarly, the inverter 110 may convert mechanical power transferred to the motor 120 to DC electric power to generate electric energy that is storable in the battery pack 112 of the RESS 104, including as part of a regenerative control strategy. The power inverter 110 may be configured to receive motor control commands from motor controller 105 and control inverter states to provide the motor drive and regeneration functionality.

Control of the power inverter 110 may include high frequency switching of the solid-state switches in accordance with a PWM control. A number of design and application considerations and limitations determine inverter switching frequency and PWM control. Commonly, inverter controls for AC motor applications may include fixed switching frequencies, for example switching frequencies around 10-12 kHz and PWM controls that minimize switching losses of the IGBTs or other power switches of the power inverter 110.

Referring to FIG. 2, the motor 120 includes a stator (S) 230 and a rotor (R) 231 and an accompanying rotor position sensor 182, for example a variable reluctance resolver or an encoder. The stator (S) 230 includes a poly-phase stator winding 233. The position sensor 182 may signally connect directly to the motor controller 105 and is employed to monitor angular position of the rotor ($\theta_e$) of the motor 120. The angular position of the rotor ($\theta_e$) of the motor 120 is employed by the motor controller 105 to control operation of the inverter 110 that controls the motor 120.

The electric propulsion system 101 on the host vehicle 100 may include a control system 208 including one or more electronic control units (ECU), for example the vehicle controller 103, the battery manager 114, and the motor controller 105. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service-related networks. Functions of the control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

The control system 208 may be responsible for carrying out functions related to the propulsion system 101 monitoring, control and diagnostics based upon a plurality of inputs. The vehicle controller 103 may include one or more ECUs and may be responsible as a supervisor for interpreting various user and environmental inputs, information and control arbitration, and issuing and receiving control commands and requests to and from various other ECUs, including the battery manager 114 and the motor controller 105 as illustrated by communication lines 242, 246 and 248. The vehicle controller 103 may be capable, directly or through another ECU, of performing vehicle-to-vehicle (V2V) and vehicle-to-infrastructure (V2I) communications related to electric power transfers from and to off-vehicle power sources. The battery manager 114 may receive a plurality of inputs 240 related to the RESS 104 including, for example, battery pack 112 voltages, currents and temperatures at cell, module and pack levels at various module configurations. The motor controller 105 may receive various inputs 252 used in the monitoring, control and diagnosis of the motor 120 and power inverter 110, including phase currents $I_A$, $I_B$ and $I_C$ from respective current sensors 260, 261 and 263 and rotor position information from the position sensor 182. The motor controller 105 may control the motor 120 by issuing conduction commands 254 to inverter solid-state switches S1 205, S2 237, S3 215, S4 207, S5 235 and S6 217. The individual conduction commands are issued for each switch S1-S6 in the form of PWM signals from the motor controller 105. Any suitable solid-state device may be employed as switches S1-S6 including, for example, solid-state relays and transistors such as Si IGBTs, Si MOSFETs, SiC MOSFETs, GaN HEMTs, SiC JFETs, Diamond, Gallium Oxide and other Wide Band Gap (WBG) semiconductor-based power switch devices. Each switch S1-S6 may also have an associated anti-parallel diode either as a discrete component or integrated with each switch S1-S6. In accordance with one embodiment, the battery manager 114 may be responsible for monitoring and diagnosis of the battery pack 112, for discharge and charge control including during propulsion operation and electric power transfers from and to off-vehicle power sources.

The power inverter 110 includes a positive DC rail 218, a negative DC rail 222 and a plurality of phase legs therebetween. The HV DC bus 108 (FIG. 1) may be selectively coupled across the positive DC rail 218 and the negative DC rail 222. Phase legs in the exemplary 3-phase power inverter 110 include switches S1 and S4 (phase leg A) coupled at node 227 (phase pole A), Switches S3 and S6 (phase leg B) coupled at node 228 (phase pole B), and switches S5 and S2 (phase leg C) coupled at node 229 (phase pole C). Switches S1 205, S3 215 and S5 235 may be referred to as upper solid-state switches as they couple to the positive DC rail 218. Switches S2 237, S4 207 and S6 217 may be referred to as lower solid-state switches as they couple to the negative DC rail 222. Phase pole A (node 227) couples to a phase winding of the motor 120 via line 250 at its respective phase terminal. Phase pole B (node 228) couples to a phase winding of the motor 120 via line 251 at its respective phase terminal. And phase pole C (node 229) couples to a phase winding of the motor 120 via line 253 at its respective phase terminal. Each line 250, 251 and 253 may have an associated current sensor 260, 261 and 263, respectively, for sensing phase currents. High current disconnect switch SW1 216 is controllable to couple and decouple the positive DC rail 218 and the positive battery terminal over the HV DC bus 108. Likewise, high current disconnect switch SW2 212 is controllable to couple and decouple the negative DC rail 222 and the negative battery terminal over the HV DC bus 108. An inverter input bulk/filter capacitor 211 is coupled between the positive DC rail 218 and the negative DC rail 222. A capacitor pre-charge circuit 219 may enable selective charging of the capacitor 211 by coupling to the battery pack 112 prior to switch SW1 closures. For example, the capacitor pre-charge circuit 219 may be employed to pre-charge the capacitor 211 prior to effecting electric power transfer between the battery pack 112 and an off-vehicle power source. The pre-charge circuit 219 in one embodiment may include a current limiting resistor in series with a controllable switch. High current disconnect switches SW1 and SW2 may be referred to herein as DC contactors 216, 212 to distinguish them from the power inverter 110 solid-state switches S1-S6 and may be electromechanical relays or solid state switches.

An off-vehicle power source 270 may include a DC charge station such as a DCFC station, which may transfer electric power to the on-vehicle battery pack 112. The off-vehicle power source 270 may also include another electric vehicle with its own battery pack which may transfer electric power to, or receive electric power from, the on-vehicle battery pack 112. Thus, another electric vehicle may be a donor vehicle or a recipient vehicle with respect to electrical power transfer. Such a donor or recipient vehicle may be referred to as a target vehicle. The off-vehicle power source 270 may have an electrical DC power source 241 which in the case of a DC charge station may be provided through charge station rectified AC from a power grid. In the case of another electric vehicle providing or receiving electric power, the electrical DC power source 241 may be a respective battery pack. The off-vehicle power source 270 may include a filter capacitor 239 coupled across the DC power source 241 which may be pre-charged in advance of an electric power transfer between the battery pack 112 and the off-vehicle power source 270. A capacitor pre-charge circuit (not shown) may be employed to pre-charge the capacitor 239. The off-vehicle power source 270 may be connected to the host vehicle 100 through a charge port 238 capable of DC-DC power transfer, for example through CCS, CHAdeMO, or other DC-DC capable connector protocol or standard, including wired communications between the host vehicle 100 and the off-vehicle power source 270. The off-vehicle power source 270 may include high current disconnect switches (not shown) to selectively couple the DC power source 241 to the charge port 238. When connected via the charge port 238, the off-vehicle power source 270 may be coupled to the negative DC rail 222 of the power inverter 110 and selectively coupled by a high current switch SW3 236 on the host vehicle 100 to the stator winding 233 of the stator (S) 230. The switch SW3 236 is between the off-vehicle DC power source and the poly-phase stator winding 233 of the stator (S) 230. The switch SW3 236 may be normally open during propulsion operation and closed during electric power transfer between the battery pack 112 and the off-vehicle power source 270 in accordance with the present disclosure. High current switch SW3 236 may be referred to herein as the DC stator contactor 236.

Figure 3A:
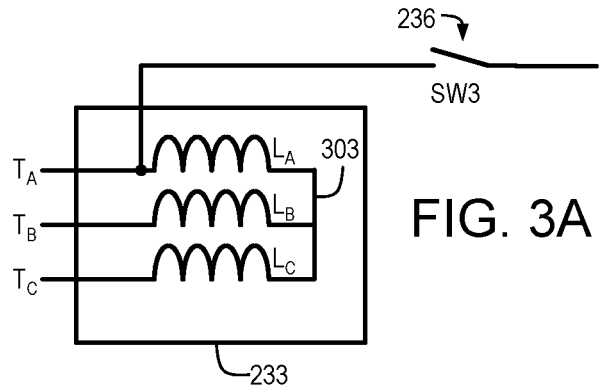
FIGS. 3A-3C illustrate alternative configurations for a poly-phase stator winding and coupling to an off-vehicle power source, in accordance with one or more embodiments.
Figure 3B:
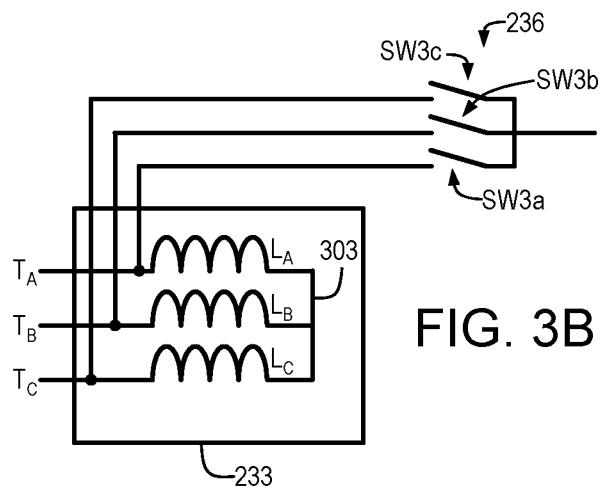
Figure 3C:
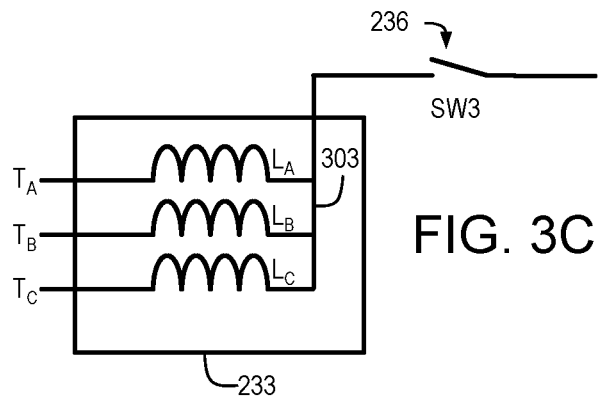

With reference to FIGS. 3A-3C, alternative configurations for poly-phase stator winding 233 and switch SW3 236 are illustrated. In all FIGS. 3A-3B, the poly-phase stator winding includes three phase windings $L_A$, $L_B$ and $L_C$. All phase winding are commonly coupled at a neutral terminal 303 and have opposite phase terminals $T_A$, $T_B$ and $T_C$. Though not shown in FIGS. 3A-3C, the phase terminals connect to respective phase legs A, B and C as described herein. Various combinations of the three phase windings $L_A$, $L_B$ and $L_C$ may result in various inductive networks achievable in accordance with the alternative configurations in FIGS. 3A-3C and conduction states of the switches S1-S6 as described herein.

In the configuration corresponding to FIG. 3A, the switch SW3 236 is coupled to one phase terminal, phase terminal $T_A$ of phase winding $L_A$ in the illustration, thereby coupling the phase terminal $T_A$ of phase winding $L_A$ to the off-vehicle power source 270 when the switch SW3 236 is closed. The configuration corresponding to FIG. 3A may alternatively couple the switch SW3 236 to the phase terminal $T_B$ of phase winding $L_B$ or to the phase terminal $T_C$ of phase winding $L_C$. With the configuration of FIG. 3A, the power inverter 110 and stator winding 233 may be operatively configured as a switched-mode power converter with the switch SW3 closed, as described herein.

In one embodiment corresponding to the configuration of FIG. 3A, the power inverter 110 and stator winding 233 may be operatively configured as a switched-mode power converter operating in a boost mode to transfer electric power from the off-vehicle power source 270 at a lower DC voltage to the battery pack 112 on the host vehicle 100 at a higher DC voltage. Boost mode operation may be effected by controlling the conduction states of the switches S1-S6. Conduction state control of the switches S1-S6 is provided by PWM signals from the motor controller which may establish the frequency and duty cycle of the PWM signals as further described herein. A conduction state of OFF corresponds to an open switch state, and a conduction state of ON corresponds to a closed switch state. Since in the illustrated example the phase terminal $T_A$ of phase winding $L_A$ is coupled to the off-vehicle power source 270, the phase leg A switches S1, S4 conduction states are maintained OFF. Electrical energy from the off-vehicle power source 270 may be stored in the inductive network of phase windings $L_A$ and $L_B$ by controlling the conduction state of the phase leg B lower switch S6 ON. The electrical energy stored in the phase windings $L_A$ and $L_B$ may then be released into the battery pack 112 on the host vehicle 100 by conduction of the anti-parallel diode associated with phase leg B upper switch S3 by controlling the conduction state of the phase leg B lower switch S6 OFF. Repetitive conduction state control of the phase leg B lower switch S6 operatively configures the power inverter 110 and stator winding 233 as a switched-mode power converter operating in a boost mode. Alternatively, electrical energy from the off-vehicle power source 270 may be stored in the inductive network of phase windings $L_A$ and $L_C$ by controlling the conduction state of the phase leg C lower switch S2 ON. The electrical energy stored in the phase windings $L_A$ and $L_C$ may then be released into the battery pack 112 on the host vehicle 100 by conduction of the anti-parallel diode associated with phase leg C upper switch S5 by controlling the conduction state of the phase leg C lower switch S2 OFF. Repetitive conduction state control of the phase leg C lower switch S2 operatively configures the power inverter 110 and stator winding 233 as a switched-mode power converter operating in a boost mode. Advantageously, the repetitive conduction state control of the phase leg B lower switch S6 and the phase leg C lower switch S2 may be interleaved or alternated. Advantageously, the repetitive conduction state control of the phase leg B lower switch S6 and the phase leg C lower switch S2 may be synchronized or simultaneous.

In another embodiment corresponding to the configuration of FIG. 3A, the power inverter 110 and stator winding 233 may be operatively configured as a switched-mode power converter operating in a buck mode to transfer electric power from the battery pack 112 on the host vehicle 100 at a higher DC voltage to the off-vehicle power source 270 at a lower DC voltage. Buck mode operation may be effected by controlling the conduction states of the switches S1-S6. Conduction state control of the switches S1-S6 is provided by PWM signals from the motor controller which may establish the frequency and duty cycle of the PWM signals as further described herein. A conduction state of OFF corresponds to an open switch state, and a conduction state of ON corresponds to a closed switch state. Since in the illustrated example the phase terminal $T_A$ of phase winding $L_A$ is coupled to the off-vehicle power source 270, the phase leg A switches S1, S4 conduction states are maintained OFF. Electrical energy from the battery pack 112 on the host vehicle 100 may be stored in the inductive network of phase windings $L_A$ and $L_B$ by controlling the conduction state of the phase leg B upper switch S3 ON. The electrical energy stored in the phase windings $L_A$ and $L_B$ may then be released into the off-vehicle power source 270 by conduction of the anti-parallel diode associated with phase leg B lower switch S6 by controlling the conduction state of the phase leg B upper switch S3 OFF. Repetitive conduction state control of the phase leg B upper switch S3 operatively configures the power inverter 110 and stator winding 233 as a switched-mode power converter operating in a buck mode. Alternatively, electrical energy from the off-vehicle power source 270 may be stored in the inductive network of phase windings $L_A$ and $L_C$ by controlling the conduction state of the phase leg C upper switch S5 ON. The electrical energy stored in the phase windings $L_A$ and $L_C$ may then be released into the off-vehicle power source 270 by conduction of the anti-parallel diode associated with phase leg C lower switch S2 by controlling the conduction state of the phase leg C upper switch S5 OFF. Repetitive conduction state control of the phase leg C upper switch S5 operatively configures the power inverter 110 and stator winding 233 as a switched-mode power converter operating in a buck mode. Advantageously, the repetitive conduction state control of the phase leg B upper switch S3 and the phase leg C upper switch S5 may be interleaved or alternated. Advantageously, the repetitive conduction state control of the phase leg B upper switch S3 and the phase leg C upper switch S5 may be synchronized or simultaneous.

In the configuration corresponding to FIG. 3B, the switch SW3 236 is a plurality of switches (SW3$a$, SW3$b$, SW3$c$) coupling the off-vehicle power source 270 to respective ones of the phase terminals $T_A$, $T_B$, and $T_C$, of corresponding phase windings $L_A$, $L_B$ and $L_C$ when the respective switch (SW3$a$, SW3$b$, SW3$c$) is closed. With the configuration of FIG. 3B, the power inverter 110 and stator winding 233 may be operatively configured as a switched-mode power converter with any one of the switches (SW3$a$, SW3$b$, SW3$c$) closed. Alternatively, any two of the switches (SW3$a$, SW3$b$, SW3$c$) may be closed so long as at least one of the switches (SW3$a$, SW3$b$, SW3$c$) remains open.

In one embodiment corresponding to the configuration of FIG. 3B, the power inverter 110 and stator winding 233 may be operatively configured as a switched-mode power converter operating in a boost mode to transfer electric power from the off-vehicle power source 270 at a lower DC voltage to the battery pack 112 on the host vehicle 100 at a higher DC voltage. Boost mode operation may be effected by controlling the conduction states of the switches S1-S6. Conduction state control of the switches S1-S6 is provided by PWM signals from the motor controller which may establish the frequency and duty cycle of the PWM signals as further described herein. A conduction state of OFF corresponds to an open switch state, and a conduction state of ON corresponds to a closed switch state. For illustration, switch SW3$a$ is assumed closed and switches SW3$b$ and SW3$c$ are assumed open. Since the phase terminal $T_A$ of phase winding $L_A$ is coupled to the off-vehicle power source 270, the phase leg A switches S1, S4 conduction states are maintained OFF. Electrical energy from the off-vehicle power source 270 may be stored in the inductive network of phase windings $L_A$ and $L_B$ by controlling the conduction state of the phase leg B lower switch S6 ON. The electrical energy stored in the phase windings $L_A$ and $L_B$ may then be released into the battery pack 112 on the host vehicle 100 by conduction of the anti-parallel diode associated with phase leg B upper switch S3 by controlling the conduction state of the phase leg B lower switch S6 OFF. Repetitive conduction state control of the phase leg B lower switch S6 operatively configures the power inverter 110 and stator winding 233 as a switched-mode power converter operating in a boost mode. Alternatively, electrical energy from the off-vehicle power source 270 may be stored in the inductive network of phase windings $L_A$ and $L_C$ by controlling the conduction state of the phase leg C lower switch S2 ON. The electrical energy stored in the phase windings $L_A$ and $L_C$ may then be released into the battery pack 112 on the host vehicle 100 by conduction of the anti-parallel diode associated with phase leg C upper switch S5 by controlling the conduction state of the phase leg C lower switch S2 OFF. Repetitive conduction state control of the phase leg C lower switch S2 operatively configures the power inverter 110 and stator winding 233 as a switched-mode power converter operating in a boost mode. Advantageously, the repetitive conduction state control of the phase leg B lower switch S6 and the phase leg C lower switch S2 may be interleaved or alternated. Advantageously, the repetitive conduction state control of the phase leg B lower switch S6 and the phase leg C lower switch S2 may be synchronized or simultaneous. Various other combinations of switch (SW3$a$, SW3$b$, SW3$c$) closures and conduction state control of one or more phase legs A, B and C lower switches S4, S6 and S2 for storing and releasing energy from corresponding combinations of the phase windings $L_A$, $L_B$ and $L_C$ to operatively configures the power inverter 110 and stator winding 233 as a switched-mode power converter operating in a boost mode are possible and will be apparent in view of the present disclosure.

In another embodiment corresponding to the configuration of FIG. 3B, the power inverter 110 and stator winding 233 may be operatively configured as a switched-mode power converter operating in a buck mode to transfer electric power from the battery pack 112 on the host vehicle 100 at a higher DC voltage to the off-vehicle power source 270 at a lower DC voltage. Buck mode operation may be effected by controlling the conduction states of the switches S1-S6. Conduction state control of the switches S1-S6 is provided by PWM signals from the motor controller which may establish the frequency and duty cycle of the PWM signals as further described herein. A conduction state of OFF corresponds to an open switch state, and a conduction state of ON corresponds to a closed switch state. For illustration, switch SW3$a$ is assumed closed and switches SW3$b$ and SW3$c$ are assumed open. Since the phase terminal $T_A$ of phase winding $L_A$ is coupled to the off-vehicle power source 270, the phase leg A switches S1, S4 conduction states are maintained OFF. Electrical energy from the battery pack 112 on the host vehicle 100 may be stored in the phase windings $L_A$ and $L_B$ by controlling the conduction state of the phase leg B upper switch S3 ON. The electrical energy stored in the phase windings $L_A$ and $L_B$ may then be released into the off-vehicle power source 270 by conduction of the anti-parallel diode associated with phase leg B lower switch S6 by controlling the conduction state of the phase leg B upper switch S3 OFF. Repetitive conduction state control of the phase leg B upper switch S3 operatively configures the power inverter 110 and stator winding 233 as a switched-mode power converter operating in a buck mode. Alternatively, switch SW3$a$ closed and switches SW3$b$ and SW3$c$ open, electrical energy from the off-vehicle power source 270 may be stored in the inductive network of phase windings $L_A$ and $L_C$ by controlling the conduction state of the phase leg C upper switch S5 ON. The electrical energy stored in the phase windings $L_A$ and $L_C$ may then be released into the off-vehicle power source 270 by conduction of the anti-parallel diode associated with phase leg C lower switch S2 by controlling the conduction state of the phase leg C upper switch S5 OFF. Repetitive conduction state control of the phase leg C upper switch S5 operatively configures the power inverter 110 and stator winding 233 as a switched-mode power converter operating in a buck mode. Advantageously, the repetitive conduction state control of the phase leg B upper switch S3 and the phase leg C upper switch S5 may be interleaved or alternated. Advantageously, the repetitive conduction state control of the phase leg B upper switch S3 and the phase leg C upper switch S5 may be synchronized or simultaneous. Various other combinations of switch (SW3$a$, SW3$b$, SW3$c$) closures and conduction state control of one or more phase legs A, B and C upper switches S1, S3 and S5 for storing and releasing energy from corresponding combinations of the phase windings $L_A$, $L_B$ and $L_C$ to operatively configures the power inverter 110 and stator winding 233 as a switched-mode power converter operating in a buck mode are possible and will be apparent in view of the present disclosure.

In the configuration corresponding to FIG. 3C, the switch SW3 236 is coupled to the neutral terminal 303 of the three phase windings $L_A$, $L_B$ and $L_C$ thereby coupling three phase windings $L_A$, $L_B$ and $L_C$ to the off-vehicle power source 270 when the switch SW3 236 is closed. With the configuration of FIG. 3C, the power inverter 110 and stator winding 233 may be operatively configured as a switched-mode power converter with the switch SW3 closed.

In one embodiment corresponding to the configuration of FIG. 3C, the power inverter 110 and stator winding 233 may be operatively configured as a switched-mode power converter operating in a boost mode to transfer electric power from the off-vehicle power source 270 at a lower DC voltage to the battery pack 112 on the host vehicle 100 at a higher DC voltage. Boost mode operation may be effected by controlling the conduction states of the switches S1-S6. Conduction state control of the switches S1-S6 is provided by PWM signals from the motor controller which may establish the frequency and duty cycle of the PWM signals as further described herein. A conduction state of OFF corresponds to an open switch state, and a conduction state of ON corresponds to a closed switch state. Since the neutral terminal 303 of the stator winding is coupled to the off-vehicle power source 270, the conduction states of the respective lower switch of any phase leg A, B or C may be conduction controlled to operatively configure the power inverter 110 and stator winding 233 as a switched-mode power converter operating in a boost mode. Taking phase leg A as exemplary, the phase leg B and C switches S3, S6, S5 and S2 conduction states are maintained OFF. Electrical energy from the off-vehicle power source 270 may be stored in the inductive network of phase winding $L_A$ by controlling the conduction state of the phase leg A lower switch S4 ON. The electrical energy stored in the phase windings $L_A$ may then be released into the battery pack 112 on the host vehicle 100 by conduction of the anti-parallel diode associated with phase leg A upper switch S1 by controlling the conduction state of the phase leg A lower switch S4 OFF. Repetitive conduction state control of the phase leg A lower switch S4 operatively configures the power inverter 110 and stator winding 233 as a switched-mode power converter operating in a boost mode. Alternatively, electrical energy from the off-vehicle power source 270 may be stored in the inductive network of phase windings $L_B$ or $L_C$ in similar fashion by controlling the conduction state of the respective phase leg B or C lower switch S6 or S2 ON. The electrical energy stored in the phase winding $L_B$ or $L_C$ may then be released into the battery pack 112 on the host vehicle 100 by conduction of the anti-parallel diode associated with respective phase leg B or C upper switch S3 or S5 by controlling the conduction state of the respective phase leg B or C lower switch S6 or S2 OFF. Repetitive conduction state control of the phase leg B or C lower switch S6 or S2 operatively configures the power inverter 110 and stator winding 233 as a switched-mode power converter operating in a boost mode. Advantageously, the repetitive conduction state control of two or three of the phase legs A, B and C lower switches S4, S6 and S2 may be interleaved or alternated. Advantageously, the repetitive conduction state control of two or three of the phase legs A, B and C lower switches S4, S6 and S2 may be synchronized or simultaneous.

In another embodiment corresponding to the configuration of FIG. 3C, the power inverter 110 and stator winding 233 may be operatively configured as a switched-mode power converter operating in a buck mode to transfer electric power from the off-vehicle power source 270 at a lower DC voltage to the battery pack 112 on the host vehicle 100 at a higher DC voltage. Boost mode operation may be effected by controlling the conduction states of the switches S1-S6. Conduction state control of the switches S1-S6 is provided by PWM signals from the motor controller which may establish the frequency and duty cycle of the PWM signals as further described herein. A conduction state of OFF corresponds to an open switch state, and a conduction state of ON corresponds to a closed switch state. Since the neutral terminal 303 of the stator winding is coupled to the off-vehicle power source 270, the conduction states of the respective lower switch of any phase leg A, B or C may be conduction controlled to operatively configure the power inverter 110 and stator winding 233 as a switched-mode power converter operating in a buck mode. Taking phase leg A as exemplary, the phase leg B and C switches S3, S6, S5 and S2 conduction states are maintained OFF. Electrical energy from the off-vehicle power source 270 may be stored in the inductive network of phase winding $L_A$ by controlling the conduction state of the phase leg A upper switch S1 ON. The electrical energy stored in the phase windings $L_A$ may then be released into the battery pack 112 on the host vehicle 100 by conduction of the anti-parallel diode associated with phase leg A lower switch S4 by controlling the conduction state of the phase leg A upper switch S1 OFF. Repetitive conduction state control of the phase leg A upper switch S1 operatively configures the power inverter 110 and stator winding 233 as a switched-mode power converter operating in a boost mode. Alternatively, electrical energy from the off-vehicle power source 270 may be stored in the inductive network of phase windings $L_B$ or $L_C$ in similar fashion by controlling the conduction state of the respective phase leg B or C upper switch S3 or S5 ON. The electrical energy stored in the phase winding $L_B$ or $L_C$ may then be released into the battery pack 112 on the host vehicle 100 by conduction of the anti-parallel diode associated with the respective phase leg B or C lower switch S6 or S2 by controlling the conduction state of the respective phase leg B or C upper switch S3 or S5 OFF. Repetitive conduction state control of the phase leg B or C upper switch S3 or S5 operatively configures the power inverter 110 and stator winding 233 as a switched-mode power converter operating in a buck mode. Advantageously, the repetitive conduction state control of two or three of the phase legs A, B and C upper switches S1, S3 and S5 may be interleaved or alternated. Advantageously, the repetitive conduction state control of two or three of the phase legs A, B and C upper switches S1, S3 and S5 may be synchronized or simultaneous.

The phase windings $L_A$, $L_B$ and $L_C$ of the stator winding 233 may be inductively coupled both through the stator structure and through the rotor structure. Inductive coupling of the phase windings $L_A$, $L_B$ and $L_C$ may affect the net equivalent inductance of any given inductive network achievable with the configurations of FIGS. 3A-3C and conduction states of the switches S1-S6 as described herein. The rotor (R) 231 may have a variable effect upon the net equivalent inductance of any given inductive network in accordance with the rotor (R) angular position. Thus, the parked or static position of the rotor (R) 231 at one angle may result in one net equivalent inductance of any given inductive network that may be different from the net equivalent inductance of the same given inductive network with the rotor (R) 231 parked at a different angle. Advantageously, the parked position of the rotor (R) 231 may be controlled by the power inverter 110 in accordance with predetermined angular positions and the electric power transfer objectives. For example, certain rotor positions may result in higher equivalent inductance values for the inductive networks configurable with the hardware architecture of the host vehicle 100 and may be desirable with respect to electrical energy transfer efficiency objectives. Thus, the host vehicle 100 may pull into a bay adjacent to a DCFC charge station and stop at a final position. The vehicle operator may shift or request the host vehicle drivetrain into a park state. The motor controller 105 may then issue torque commands to the motor 120 as required to establish the rotor (R) 231 angular position ($\theta_e$) to a predetermined angle, for example to align the rotor d-axis relative to a stator winding axis.

Figure 4:
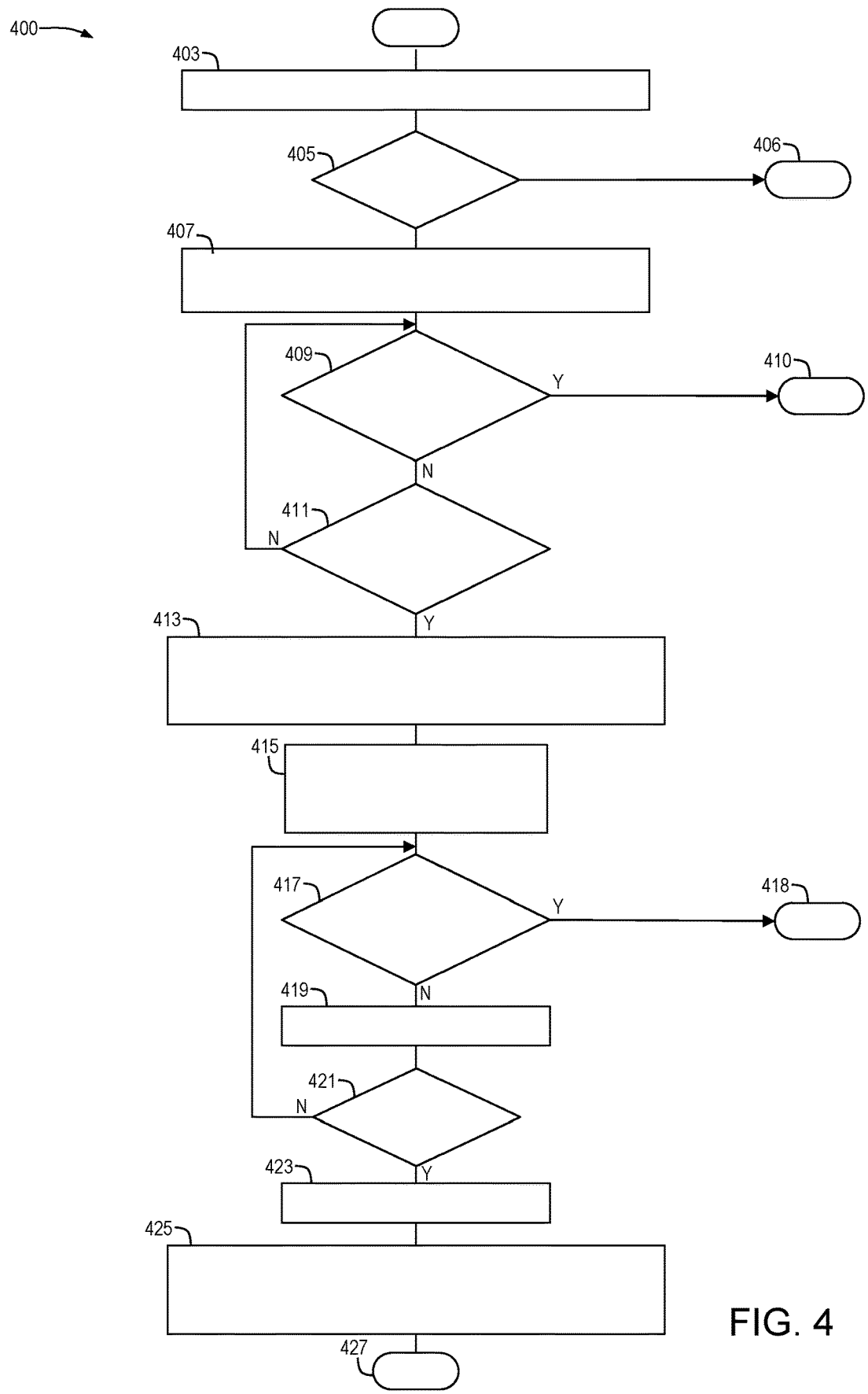
FIG. 4 illustrates a flowchart routine of a plurality of tasks related to electric power transfer between an on-vehicle power source and an off-vehicle power source, in accordance with one or more embodiments.

An exemplary method of electric power transfer between an on-vehicle power source and an off-vehicle power source for an EV through control of a system as described herein is set forth in FIG. 4. FIG. 4 represents a plurality of tasks in a flowchart routine 400 that may be carried out, at least in part, under the control of one or more ECUs such as the vehicle controller 103, the motor controller 105, and the battery manager 114 described in conjunction with FIG. 1 and FIG. 2. At least some of the tasks of FIG. 4 may be embodied in computer readable code or instruction sets stored within non-volatile memory of one or more ECUs. In the present example, the host vehicle 100 may have a native 800 volt propulsion architecture wherein the battery pack 112 is configured at a nominal 800 volts. Beginning at 403, the host vehicle operator may bring the host vehicle 100 into a charging bay adjacent to a charge station and control the host vehicle 100 to a stop. At 405, a determination is made regarding the DC capabilities of the charging station. For the present purposes, it is assumed that the charging station is either 400 volt DC capable or 800 volt DC capable. The determination at 405 may be through operator interaction with the host vehicle 100 (e.g., touchscreen selections, dialogue manager, etc.), smart phone application, map data, short range wireless communication between the host vehicle 100 and the charging station (e.g., V2I communication), short range wireless communication between the host vehicle 100 and a target vehicle (e.g., V2V communication), or other means. The determination at 405 may be made prior to any charge port connections being made between the charge station or target vehicle and the host vehicle 100. Alternatively, the determination at 405 may be made subsequent to a charge port connection using the communication capabilities of the charge port. If the charging station is 800 volt DC capable, then the routine exits at 406, for example to an 800 volt charging routine unrelated to the present disclosure. If the charging station is 400 volt DC capable, then the routine continues to 407 for hardware selection and configuration and rotor positioning control in anticipation of an electric charge transfer using the power inverter 110 and stator winding 233 as a switched-mode power converter operating in a boost mode as described herein. At 407, if the host vehicle includes two or more EDUs 102 that are configurable as independent switched-mode power converters as described herein, then one of the EDUs may be specified for use during the present electric power transfer. Such a determination may be based upon the respective motor's stator winding 233 and DC stator contactor 235 hardware (FIGS. 3A-3C) and the rotor (R) 231 parked position. For example, the hardware of FIG. 3A may be more limiting than the hardware of FIGS. 3B and 3C relative to any preferred rotor angle owing to a hard configuration constraint tied to one of the phase windings (e.g., phase winding $L_A$ in the illustration) which is more likely to require larger rotor position changes than can be accommodated within system limits. In distinction, the hardware of FIG. 3B or FIG. 3C have three selectable degrees of configuration (e.g., one tied to each of the phase windings $L_A$, $L_B$ and $L_C$) and the system flexibility to choose one that requires smaller rotor position changes more likely to be accommodated within system limits. Therefore, at 407, if the host vehicle includes two or more EDUs 102 that are configurable as independent switched-mode power converters as described herein, then one of the EDUs may be specified for use during the present electric power transfer based, for example, upon which EDU may accommodate its respective desired rotor adjustment within system limits. Such system limits may include rotor adjustments limited to a predetermined vehicle displacement, for example 10 mm. It is also appreciated that even in host vehicles with only one EDU that is configurable as independent switched-mode power converters as described herein, if the hardware (e.g., FIG. 3B or FIG. 3C) provides selectable degrees of configuration, then the system flexibility exists to choose one that requires smaller rotor position changes more likely to be accommodated within system limits. Therefore, at 407, if the hardware provides selectable degrees of configuration of the switched-mode power converters as described herein, then a configuration is selected for use during the present electric power transfer based, for example, upon which configuration may accommodate the desired rotor adjustment within system limits. Also at 407, the motor controller 105 may issue torque commands to the motor 120 as required to establish the rotor (R) 231 angular position ($\theta_e$) to a predetermined angle. Following any selections and rotor adjustment at 407, diagnostic checks may be performed at 409 to check for abortive faults prior to proceeding further. Abortive faults will cause the routine to exit at 410. Faults checked at 409 may include, for example, isolation faults related to proper isolation of the high voltage and low voltage systems. The routine 400 will continue to 411 in the absence of abortive faults. At 411, the routine 400 validates a proper charge port 238 connection including validation of handshaking/communications between the host vehicle 100 and the charge station via the wired communications between the host vehicle 100 and the off-vehicle power source 270. Until the charge port connection is validated at 411, the routine continues diagnostic checks at 409 as described. When the charge port connection is validated at 411, the routine 400 continues to 413 where the selected DC stator contactor(s) SW3 is closed. Additionally, the high current disconnect switches in the charge station may be commanded closed to couple the DC power source 241 to the charge port 238. Next, at 415, capacitor 211 and capacitor 239 are checked for appropriate pre-charge voltage levels and pre-charged where needed. Also at 415, the motor controller 105 establishes the switch S1-S6 configurations (i.e., which switches will require OFF states, which will require PWM control, and whether PWM control of multiple switches will be synchronous or interleaved), and PWM control of the power inverter switches S1-S6 is started. Initially, the PWM duty cycle may ramp up from small values to larger values to predetermined maximums, for example 50% duty cycle. The maximums duty cycle may vary depending on whether there is interleaved PWM control or other considerations such as converter output limits. At 417 additional diagnostics related to the power inverter 110 and motor 120 are performed and where abortive faults are found exits the routine 400 at 418. Where no abortive faults are found at 417, the routine 400 proceeds to 419 whereat the host vehicle 100 issues control commands to the charge station. Such commands may originate with the battery manager 114 and may include current commands. The routine 400 continues at 421 whereat end of charge is determined for example by battery manager 114 state-of-charge tracking or other metrics. Where charging is incomplete, the routine 400 continues, for example by continuing with diagnostics at 417 and issue of control commands to the charge station at 419. When charging is complete, the routine 400 proceeds to 423 where the battery manager 114 may issue current commands dropping the charge current to zero, 425 where the high current disconnect switches in the charge station may be commanded opened and the selected DC stator contactor(s) SW3 also opened. At 427 the routine 400 is ended.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method for electrical energy transfer between an on-vehicle DC power source and an off-vehicle DC power source, the on-vehicle DC power source and the off-vehicle DC power source having respective nominal voltages, wherein the nominal voltage of the on-vehicle DC power source is greater than the nominal voltage of the off-vehicle DC power source, comprising:
   establishing a rotor position of an on-vehicle traction motor at a predetermined electrical angle;
   wherein the predetermined electrical angle is determined based on a selectable degree of configuration of the plurality of stator phase windings
   coupling the on-vehicle DC power source between positive and negative DC rails of a power inverter having a plurality of phase legs coupled to a corresponding plurality of stator phase windings of the on-vehicle traction motor;
   coupling the off-vehicle DC power source to at least one phase winding of the plurality of stator phase windings through a charge port connection, the coupling including validating the charge port connection and closing high current disconnect switches in the off-vehicle DC power source; and
   controlling conduction of the plurality of phase legs of the power inverter to operatively configure the power inverter and the plurality of stator phase windings as a switched-mode power converter comprising the at least one phase winding and at least one switch of one of the plurality of phase legs,
   wherein controlling conduction of the plurality of phase legs of the power inverter comprises initially controlling conduction with an increasing duty cycle pulse width modulation up to a predetermined maximum duty cycle, and
   wherein one of the on-vehicle DC power source and the off-vehicle DC power source acts as a source and the other of the on-vehicle DC power source and the off-vehicle DC power source acts as a load.

2. The method of claim 1 wherein each phase leg of the power inverter comprises respective upper and lower solid-state switches, wherein controlling conduction of the plurality of phase legs of the power inverter comprises controlling conduction of the respective upper solid-state switch of at least one phase leg to operatively configure the power inverter and the plurality of stator phase windings as a switched-mode power converter operating in a buck mode wherein energy is transferred from the on-vehicle DC power source to the off-vehicle DC power source.

3. The method of claim 1 wherein each phase leg of the power inverter comprises respective upper and lower solid-state switches, wherein controlling conduction of the plurality of phase legs of the power inverter comprises controlling interleaved conduction of the respective upper solid-state switches of at least two phase legs to operatively configure the power inverter and the plurality of stator phase windings as a switched-mode power converter operating in a buck mode wherein energy is transferred from the on-vehicle DC power source to the off-vehicle DC power source.

4. The method of claim 1 wherein each phase leg of the power inverter comprises respective upper and lower solid-state switches, wherein controlling conduction of the plurality of phase legs of the power inverter comprises controlling synchronous conduction of the respective upper solid-state switches of at least two phase legs to operatively configure the power inverter and the plurality of stator phase windings as a switched-mode power converter operating in a buck mode wherein energy is transferred from the on-vehicle DC power source to the off-vehicle DC power source.

5. The method of claim 1 wherein each phase leg of the power inverter comprises respective upper and lower solid-state switches, wherein controlling conduction of the plurality of phase legs of the power inverter comprises controlling conduction of the respective lower solid-state switch of at least one phase leg to operatively configure the power inverter and the plurality of stator phase windings as a switched-mode power converter operating in a boost mode wherein energy is transferred from the off-vehicle DC power source to the on-vehicle DC power source.

6. The method of claim 1 wherein each phase leg of the power inverter comprises respective upper and lower solid-state switches, wherein controlling conduction of the plurality of phase legs of the power inverter comprises controlling interleaved conduction of the respective lower solid-state switches of at least two phase legs to operatively configure the power inverter and the plurality of stator phase windings as a switched-mode power converter operating in a boost mode wherein energy is transferred from the off-vehicle DC power source to the on-vehicle DC power source.

7. The method of claim 1 wherein each phase leg of the power inverter comprises respective upper and lower solid-state switches, wherein controlling conduction of the plurality of phase legs of the power inverter comprises controlling synchronous conduction of the respective lower solid-state switches of at least two phase legs to operatively configure the power inverter and the plurality of stator phase windings as a switched-mode power converter operating in a boost mode wherein energy is transferred from the off-vehicle DC power source to the on-vehicle DC power source.

8. An apparatus for electrical energy transfer between an on-vehicle DC power source and an off-vehicle DC power source, comprising:

the on-vehicle DC power source and the off-vehicle DC power source having respective nominal voltages, wherein the nominal voltage of the on-vehicle DC power source is greater than the nominal voltage of the off-vehicle DC power source;

a traction motor including a poly-phase stator winding having a plurality of stator phase windings commonly coupled at a neutral terminal and having respective phase terminals;

a power inverter having a plurality of phase legs coupled between positive and negative DC rails, the positive and negative DC rails coupled across the on-vehicle DC power source, and each phase leg including respective upper and lower solid-state switches with a respective phase pole therebetween coupled to a respective one of the stator phase windings at its corresponding phase terminal;

at least one switch between the off-vehicle DC power source and the poly-phase stator winding; and a controller:

establishing a rotor position of the traction motor at a predetermined electrical angle;

coupling the off-vehicle DC power source to at least one phase winding of the plurality of stator phase windings through a charge port connection, the coupling including validating the charge port connection, closing high current disconnect switches in the off-vehicle DC power source, and operating the at least one switch closed; and controlling conduction of the phase legs of the power inverter to operatively configure the power inverter and the stator phase windings as a switched-mode power converter comprising at least one of the stator phase windings and one of the upper and lower solid-state switches of at least one of the phase legs, wherein one of the on-vehicle DC power source and the off-vehicle DC power source acts as a source and the other of the on-vehicle DC power source and the off-vehicle DC power source acts as a load.

9. The apparatus of claim 8 wherein the at least one switch between the off-vehicle DC power source and the poly-phase stator winding comprises a switch between the off-vehicle DC power source and the respective phase terminal of one of the stator phase windings.

10. The apparatus of claim 8 wherein the at least one switch between the off-vehicle DC power source and the poly-phase stator winding comprises a plurality of switches, each one of the plurality of switches between the off-vehicle DC power source and the corresponding respective phase terminal of a respective one of the stator phase windings.

11. The apparatus of claim 8 wherein the at least one switch between the off-vehicle DC power source and the poly-phase stator winding comprises a switch between the off-vehicle DC power source and the neutral terminal of the plurality of stator phase windings.

12. The apparatus of claim 8 wherein the predetermined electrical angle is determined based on a selectable degree of configuration of the plurality of stator phase windings.

13. The apparatus of claim 8 wherein controlling conduction of the phase legs of the power inverter comprises controlling conduction of the respective upper solid-state switch of at least one phase leg to operatively configure the power inverter and the stator phase windings as a switched-mode power converter operating in a buck mode wherein energy is transferred from the on-vehicle DC power source to the off-vehicle DC power source.

14. The apparatus of claim 8 wherein each phase leg of the power inverter comprises respective upper and lower solid-state switches, wherein controlling conduction of the phase legs of the power inverter comprises controlling interleaved conduction of the respective upper solid-state switches of at least two phase legs to operatively configure the power inverter and the stator phase windings as a switched-mode power converter operating in a buck mode wherein energy is transferred from the on-vehicle DC power source to the off-vehicle DC power source.

15. The apparatus of claim 8 wherein each phase leg of the power inverter comprises respective upper and lower solid-state switches, wherein controlling conduction of the phase legs of the power inverter comprises controlling synchronous conduction of the respective upper solid-state switches of at least two phase legs to operatively configure the power inverter and the stator phase windings as a switched-mode power converter operating in a buck mode wherein energy is transferred from the on-vehicle DC power source to the off-vehicle DC power source.

16. The apparatus of claim 8 wherein each phase leg of the power inverter comprises respective upper and lower solid-state switches, wherein controlling conduction of the phase legs of the power inverter comprises controlling conduction of the respective lower solid-state switch of at least one phase leg to operatively configure the power inverter and the stator phase windings as a switched-mode power converter operating in a boost mode wherein energy is transferred from the off-vehicle DC power source to the on-vehicle DC power source.

17. The apparatus of claim 8 wherein each phase leg of the power inverter comprises respective upper and lower solid-state switches, wherein controlling conduction of the phase legs of the power inverter comprises controlling interleaved conduction of the respective lower solid-state switches of at least two phase legs to operatively configure the power inverter and the stator phase windings as a switched-mode power converter operating in a boost mode wherein energy is transferred from the off-vehicle DC power source to the on-vehicle DC power source.

18. The apparatus of claim 8 wherein each phase leg of the power inverter comprises respective upper and lower solid-state switches, wherein controlling conduction of the phase legs of the power inverter comprises controlling synchronous conduction of the respective lower solid-state switches of at least two phase legs to operatively configure the power inverter and the stator phase windings as a switched-mode power converter operating in a boost mode wherein energy is transferred from the off-vehicle DC power source to the on-vehicle DC power source.

19. A vehicle comprising:

an on-vehicle DC power source; and an apparatus for electrical energy transfer between the on-vehicle DC power source and an off-vehicle DC power source, comprising:

the on-vehicle DC power source and the off-vehicle DC power source having respective nominal voltages, wherein the nominal voltage of the on-vehicle DC power source is greater than the nominal voltage of the off-vehicle DC power source;

a traction motor including a poly-phase stator winding having a plurality of stator phase windings commonly coupled at a neutral terminal and having respective phase terminals;

a power inverter having a plurality of phase legs coupled between positive and negative DC rails, the positive and negative DC rails coupled across the on-vehicle DC power source, and each phase leg including respective upper and lower solid-state switches with a respective phase pole therebetween coupled to a respective one of the stator phase windings at its corresponding phase terminal;

at least one switch between the off-vehicle DC power source and the poly-phase stator winding; and a controller:
  establishing a rotor position of the traction motor at a predetermined electrical angle;
  coupling the off-vehicle DC power source to at least one phase winding of the plurality of stator phase windings through a charge port connection, the coupling including validating the charge port connection, closing high current disconnect switches in the off-vehicle DC power source, and operating the at least one switch closed; and
  controlling conduction of the phase legs of the power inverter to operatively configure the power inverter and the stator phase windings as a switched-mode power converter comprising at least one of the stator phase windings and one of the upper and lower solid-state switches of at least one of the phase legs,
  wherein one of the on-vehicle DC power source and the off-vehicle DC power source acts as a source and the other of the on-vehicle DC power source and the off-vehicle DC power source acts as a load.

20. The vehicle of claim 19, wherein the at least one switch between the off-vehicle DC power source and the poly-phase stator winding comprises a switch between the off-vehicle DC power source and the respective phase terminal of one of the stator phase windings.

* * * * *